United States Patent Office 2,951,194
Patented Aug. 30, 1960

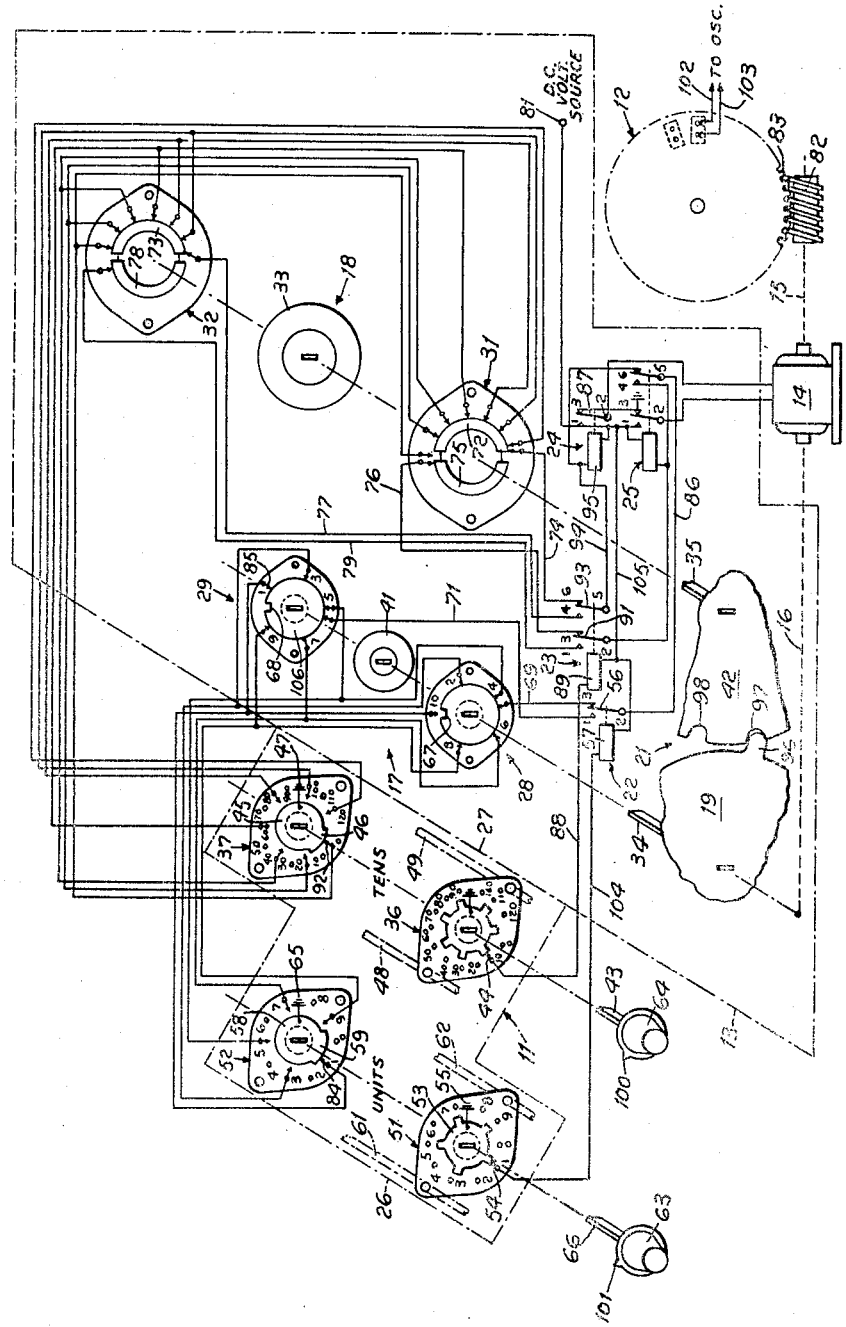

2,951,194

POSITION SELECTOR SYSTEM

Benjamin B. Mahler, Paramus, and S Duane Hammond, Nutley, N.J., assignors to International Telephone and Telegraph Corporation, Nutley, N.J., a corporation of Maryland Filed Apr. 3, 1958, Ser. No. 726,261

5 Claims. (Cl. 318—467)

This invention relates to a remote control system and more particularly to an electromechanical circuit for positioning a remotely located device in accordance with the setting of a position selector.

In the past it has been conventional to construct a servo system to position a remote device in accordance with a command applied to a control device. These servo systems usually consist of high and low speed control transformers, a servomotor, an amplifier, a gear box, and a transfer device. The reliability of these servo systems under actual service conditions is sometimes questionable due to the inherent delicate nature of power amplifiers. These systems have also been found to be relatively high in cost and difficult to maintain. Another factor which adds to the complexity in maintaining such equipment is that slight changes in the characteristics of the components of this servo system, which an operator has no way of discovering, can cause an incorrect final position setting of the remote device.

In the proposed system it is necessary to control a crystal turret which has a plurality of positions, each position signifying a different crystal frequency. This crystal turret is controlled from a remote location by energizing an electric motor through a motor control circuit which causes the electric motor to rotate the crystal turret to the position selected by a position selector. In this manner the crystal turret or for that matter any type of remote device may be positioned into as many angular positions as the position selector has contacts. The drawback of earlier types of remote control systems was that it was necessary to connect each contact of the position selector to each corresponding contact of the remote device. Where the number of contacts of the position selector exceeds a small number, the number of conductors or wires becomes excessive requiring a heavy cable to connect the position control circuit to the remote device.

In addition, most position selector systems operate in a unidirectional manner. That is, these systems will not move from one position to another in the shortest possible distance, but will only move in a preset direction. As a result of this, bidirectional position selector systems have a distinct advantage over unidirectional position selector systems in that the bidirectional types of systems will seek the position selected in the shortest possible time since it will move from one position to another in the shortest possible distance.

It is therefore an object of this invention to provide a novel position selector system which permits bidirectional positioning of a device from a remote location.

It is a further object of this invention to provide a system which performs the same function as a servo system but with additional reliability and at less cost.

A still further object of the present invention is to provide a position selector system which may readily be modified to provide any number of desired positions on the device to be controlled without requiring an excessive number of wires between the control device and the device to be positioned.

In accordance with our invention, there is provided a position selector circuit for automatically positioning a remote device. This position selector comprises selector means which are selectively movable over a plurality of control positions. In addition, a motor control means is used to control the direction and extent of rotation of a motor. This motor control means includes switching means which have a number of switching positions corresponding to the control positions of the selector means. There are lead connections coupled between the control positions of the selector means and the switching positions of the switching means. There is also a shaft coupling the motor to the switching means for movement thereof in accordance with the operation of the motor. The motor control means also has means controlled by the switching means which cause the motor to operate to any new control position established by the selector means. This motor will be stopped when the switching means driven by the motor is driven to a position corresponding to the control position established by the selector means.

The above-mentioned and other features and objects of this invention will become more apparent by reference to the following description taken in conjunction with the accompanying drawings, in which the sole figure is an isometric view and schematic circuit diagram of the bidirectional position selector system arranged for remotely controlling the position of a turret.

Referring now to the figure, there is illustrated a position selector system embodying the present invention. The system includes a position selector indicated by dotted lines 11 and a remote device 12, which is to be controlled. This remote device 12 could have many embodiments, one example being a crystal turret for tuning an RF oscillator in 126 steps starting from a minimum frequency of 962 megacycles to a maximum frequency of 1150 megacycles. The output of the position selector 11 is fed to a motor control circuit indicated by dotted line 13. The output of the motor control circuit 13 is coupled to electric motor 14 and acts to control the direction and extent of rotation of said motor. Electric motor 14 is mechanically coupled to the crystal turret as indicated by dotted line 15, and to the shaft 34 of the units rotor 17 as indicated by dotted line 16.

The motor control circuit 13 includes a units rotor 17 and a tens rotor 18 which are coupled between the input wheel 19 and the output wheel 42 of Geneva movement 21 and relays 24 and 25 which activate electric motor 14. Units rotor 17 is adapted to receive the outputs from the position selected on the units wafer switch 26, whereas tens rotor 18 is adapted to receive the outputs as selected on the tens wafer switch 27. Units rotor 17 is composed of a front portion 28 and a rear portion 29. Front portion 28 has the even numbered contact positions, such as 2, 4, etc., whereas rear portion 29 has the odd numbered contact positions, such as 1, 3, etc. The front and rear portions 28 and 29 are insulated from each other by insulator 41. For clarity, the front portion 28 and the rear portion 29 are shown spaced from each other; usually the sides of these portions 28 and 29 will normally be disposed back to back with insulator 41 therebetween.

Tens rotor 18 is constructed in a similar manner and is composed of front portion 31 which has the even numbered contact positions, such as 0, 20, etc., and rear portion 32 which has the odd numbered contact positions, such as 10, 30, etc. Between front and rear portions 31 and 32, respectively, is an insultor 33. The shaft 34 of units rotor 17 is coupled directly to the Geneva movement 21. The Geneva movement 21 consists of two wheels 19 and 42 which are meshed to each other. Wheel 19 contains only one tooth, whereas wheel 42 contains thirteen radial slots. The Geneva movement 21 is so constructed that one rotation of units rotor 17, which is coupled to wheel 19 through shaft 34, will cause wheel 42 to move one-thirteenth of a revolution. The output of wheel 42 is coupled to tens rotor 18 via shaft 35. Thus, one complete revolution of units rotor 17 will turn tens rotor 18 between two adjacent tens positions. Coupled to the outputs of rotors 17 and 18 are relays 24 and 25, respectively. These two relays in combination with relays 22 and 23 control the activation of electric motor 14.

In accordance with the present invention, position selector 11 is composed of a tens wafer switch 27 and units wafer switch 26. It should be understood that other devices may be used as position selectors, such as pushbuttons, relays, etc. Tens wafer switch 27 has a front portion 36 and a rear portion 37 which are insulated from each other. Front portion 36 is provided with thirteen positions as illustrated which are identified by numbers from zero to 120 (in steps of 10) and which are disposed circumferentially about tens wafer switch 27. In addition, front portion 36 of tens wafer switch 27 has a disk 38 whose periphery is notched in such a manner as to form seven wipers. Connected to position 10 is a contact arm 44 which will make contact with one of the wipers of disk 38 when an odd position is selected. Fixed to disk 38 is a ground connection 39 which is coupled to relay 23 via contact position 10 when disk 38 is rotated to an odd position. Ground connection 39 is applied via lead 88 to the coil 89 of relay 23, thus causing coil 89 to be energized from a D.C. voltage source 81 via lead connection 105. When coil 89 becomes energized, armature 91 moves from position 3 to position 1. Shaft 43 of tens wafer switch 27 is insulated from disk 38. The rear portion 37 of tens wafer switch 27 has thirteen positions as illustrated which correspond to the positions located on front portion 36. Connected to the even numbered positions, such as 20, 40, etc., are contact arms. In addition, rear portion 37 has a disk 45 attached thereto which is notched in such a manner as to form a wide wiper 46 which extends the width of two adjacent positions, for instance, between positions 0, 10, or positions 20, 30, etc. The even numbered positions which have contact arms attached thereto will make contact with wide wiper 46 as it is rotated through the various positions. Fixed to disk 45 is ground connection 47. As disk 45 is rotated, the ground 47 will be applied via the leads connected to the even numbered positions to the corresponding positions located at tens rotor 18. The front portion 36 and rear portion 37 of tens wafer switch 27 are mechanically fixed to each other as indicated by stationary rods 48 and 49. Disks 38 and 45 are mechanically ganged to each other on shaft 43. As control knob 64 with pointer 100 attached thereto rotates disk 38 to a desired position, disk 45 will turn to the corresponding position.

A second wafer switch, such as units wafer switch 26, forms part of the position selector system 11 and has generally the same construction as does tens wafer switch 27. Thus, units wafer switch 26 consists of a front portion 51 and a rear portion 52, each of which has 10 positions which are marked by numbers going from 1 to 10. Connected to front portion 51 is a disk 53 which is notched in such a manner as to form five wipers. A contact arm 54 is mounted on odd position 1 and acts to apply a ground 55 (which is permanently fixed to disk 53) via the wiper of disk 53 whenever said disk is rotated to an odd numbered position, such as 1, 3, etc. Ground connection 55 is applied via lead 104 to the coil 57 of relay 22, thus causing coil 57 to be energized from D.C. voltage source 81 via lead connection 105. When coil 89 is energized, arm 56 moves from position 3 to position 1. The rear portion 52 of units wafer switch 26 has 10 contact positions which correspond to the positions located on front portion 51. Connected to the even numbered positions, such as 2, 4, etc., are contact arms, as shown. In addition, rear portion 52 has a disk 58 attached thereto which is notched in such a manner as to form a wide wiper 59 which extends the width of two adjacent positions. The even numbered positions will contact disk 58 as it is rotated through the various positions. Fixed to disk 58 is ground 65. The front portion 51 and rear portion 52 of tens wafer switch 26 are mechanically fixed to each other as indicated by stationary rods 61 and 62. Disks 53 and 58 are mechanically ganged to each other via shaft 66 and rotate about tens wafer switch 26 as control knob 63 with pointer 101 attached thereon is rotated to a particular position.

Rear portion 52 of units wafer switch 26 and both front portion 28 and rear portion 29 of units rotor 17 are interconnected by leads, as shown. Thus, the even numbered positions of rear portion 52 have their leads connected to corresponding even positions located in the front portion 28 of units rotor 17 and, likewise, have their odd numbered positions connected via the leads to corresponding positions located in the rear portion 29 of units rotor 17. In addition, rear portion 37 of tens wafer switch 27 and both the front portion 31 and the rear portion 32 of tens rotor 18 are interconnected by leads, as shown. Thus, the even numbered positions of rear portion 37 have their leads connected to corresponding even positions located in the front portion 31 of tens rotor 18, and have their odd numbered positions connected via leads to the corresponding odd positions located in the rear portion 32 of tens rotor 18.

The front and rear portions 28 and 29, respectively, of units rotor 17 consist of two disks having radial slots 67 and 68 located on each of their peripheries. The output of front portion 28 is coupled to position 3 of relay 22 via lead 69. The output of rear portion 29 is fed via lead via lead 71 to position 1 of relay 22. The front portion 28 and rear portion 29 are mechanically ganged to each other and rotate about shaft 34. Shaft 34 is directly coupled to wheel 19 of Geneva movement 21. Thus, units rotor 17 will rotate in synchronism with wheel 19. Wheel 19 has one tooth located on its periphery which is meshed to rear wheel 42. Thus, as wheel 19 rotates one complete revolution, wheel 42 will rotate only one-thirteenth of a revolution. The output of wheel 42 is directly coupled to tens rotor 18 via shaft 35. Therefore, one complete revolution of units rotor 17 will result in tens rotor 18 moving one-thirteenth of a revolution or, in other words, between two adjacent positions located on units rotor 18.

The front portion 31 and rear portion 32 of tens rotor 18 consist of a pair of split rings containing two halves in each ring. As shown, half 72 of front portion 31 has located circumferentially about its periphery contact arms extending from its even numbered positions which make contact with the split rings. In turn, rear portion 32 has contact arms extending from its odd numbered positions located circumferentially about rear portion 32 and which are shown in contact with half 73 of the split ring. The output of half 72 of front portion 31 is connected to position 6 of relay 23 via lead 74, whereas the output of half 75 of front portion 31 is connected to position 3 of relay 23 via lead 76. The output of half 73 of rear portion 32 is connected via lead 77 to position 4 of relay 23, and the output of half 78 of rear portion 32 is connected via lead 79 to position 1 of relay 23. The outputs of units rotor 17 and the outputs of tens rotor 18 are respectively coupled through relays 22 and 23 to relays 24 and 25 which apply the D.C. voltage source 81 to D.C. motor 14 causing it to rotate. When relay 24 is energized, the D.C. motor 14 will rotate in the clockwise direction, whereas if relay 25 is energized, the D.C. motor 14 will rotate in the counterclockwise direction. The output of D.C. motor 14 is coupled via shafts 15 and 16 which go to the crystal turret 12 and the shaft 34 of units rotor 17, respectively. Crystal turret 12 has a worm wheel 83 formed around its outer periphery. Attached to shaft 15 is worm gear 82 which meshes to worm wheel 83. The output of D.C. motor 14 will cause crystal turret 12 to rotate to one of its 126 crystal positions corresponding to the position as initially selected by position selector 11. Wipers 102 and 103 are located on the face of crystal turret 12 and are so connected as to couple the output of each preselected crystal to an oscillator (not shown).

The operation of the position selector system will now be explained. Control knob 63 of units wafer switch 26 is rotated to a desired position. For the purposes of clarity, we will assume that control knob 63 turns disk 53 from zero position to position 1. Since an odd numbered position has been selected, ground connection 55 will be applied to relay 22 via contact arm 54 of position 1 and lead connection 104, thus causing coil 57 to be energized from D.C. voltage source 81 via lead connection 105. When coil 57 of relay 22 is energized, armature 56 moves from position 3 to position 1. As rotor 53 of front portion 51 rotates to position 1, rotor 58 of rear portion 52 which is directly coupled via shaft 66 rotates between positions zero and 1. Ground 65 is then applied via wide wiper 59 to contact arm 84 of position 1 to the corresponding position located on rear portion 29 of units rotor 17. Contact arm 85 located on position 1 of rear portion 29 applies this ground to disk 106. This ground is then applied via leads 71 to position 1 of relay 22. Armature 56 of relay 22 as previously mentioned has moved from position 3 to position 1 due to the coil 57 of relay 22 being energized through ground connection 55 applied via front portion 51 of units wafer switch 26. Thus, the ground connection applied through positions 1 and 2 of relay 22 is then applied via lead connection 86 and positions 5 and 6 of relay 25 to relay 24. This causes armature 87 of relay 24 to move from position 3 to position 1. The D.C. voltage source 81 is then applied to motor 14, causing motor 14 to rotate in a clockwise direction. Thus, shafts 15 and 16 which are coupled to motor 14 will rotate crystal turret 12 and units rotor 17 to the desired position. As stated previously, a ground was connected to position 1 of rear portion 29 of units rotor 17. Rear portion 29 will then rotate in the clockwise direction until radial slot 68 has moved opposite the contact arm 85 of position 1. The ground connection will then be removed from this position and will cause relays 22 and 24 to become de-energized resulting in motor 14 coming to rest. Thus, crystal turret 12 will now be positioned to crystal position 1 which corresponds to the initial position as selected on units wafer switch 26.

The following will describe the operation required in selecting a tens position. We will assume that control knob 64 with pointer 100 attached thereon moves rotor 38 of tens wafer switch 27 to position 10. Ground 39 which is connected to rotor 38 is then applied to the contact arm 44 of position 10. This ground connection will be applied via lead 88 to the coil 89 of relay 23, thus causing coil 89 to be energized from D.C. voltage source 81 via lead connection 105. When coil 89 is energized, armature 91 moves from position 3 to position 1. In addition, disk 45 of tens wafer switch 27, which is mechanically ganged to disk 38 via shaft 43, will move between positions zero and 10. Ground connection 47, which is connected to disk 45, will then be applied via wide wiper 46 to contact position zero via contact arm 92. This ground connection will then be applied both to positions zero and 10 on front and rear portions 31 and 32, respectively, of tens rotor 18. The ground connection applied to position zero located on front portion 31 of tens rotor 18 will not make contact with either half of the split rings of front portion 31 due to the present location of said split rings, whereas the ground applied to position 10 of rear portion 32 will make contact with half ring 73 and apply said ground connection via lead 77 to position 4 of relay 23. Relay 23 has armature 93 ganged to armature 91. Therefore, as armature 91 is moved to position 1, armature 93 moves to position 4. Thus, the ground connection applied via positions 4 and 5 of relay 23 is coupled via lead 94 to coil 95 of relay 24. Armature 87 will then move from position 3 to position 1 and D.C. voltage source 81 will be applied to the motor 14 causing it to rotate in the clockwise direction. Thus, shafts 15 and 16 which are coupled to motor 14 will again rotate crystal turret 12 and units rotor 17 to the new desired position. As units rotor 17 rotates in the clockwise direction from position 1 to the next desired position which is 10, shaft 34 of units rotor 17 will rotate wheel 19 of Geneva movement 21. As wheel 19 makes one complete revolution, wheel 42 will rotate one-thirteenth of a revolution or, in other words, tooth 96 will move from radial slot 97 to radial slot 98. Shaft 35 which is coupled to output wheel 42 will then rotate tens rotor 18 so that the opening in the split ring of rear portion 32 is located opposite the contact arm 99 of position 10. Thus, the ground is removed from this position, causing relays 23 and 24 to become de-energized and result in motor 14 coming to rest. Therefore, the position of crystal turret 12 at the time D.C. motor 14 comes to rest will be set hypothetically to a position 11, since position 10 was set on tens wafer switch 27 and position 1 was set at units wafer switch 26.

Thus, by selecting any desired position on position selector 11, the crystal turret 12 which is located at a remote distance will respond to this selected position.

While we have described above the principles of our invention in connection with specific apparatus, it is to be clearly understood that this description is made only by way of example and not as a limitation to the scope of our invention as set forth in the objects thereof and in the accompanying claims.

We claim:

1. A position selector for automatically positioning a remote device comprising a first control switch having control contacts and adapted to be rotated into a number of predetermined control positions, a second rotary control switch having control contacts and adapted to be rotated into a number of predetermined control positions, a motor, a units rotor having a number of control positions corresponding to the control contacts of said first control switch, a tens rotor having a number of control positions corresponding to the control contacts of said second control switch, conductors connecting alternate control contacts of said first control switch and said second control switch to corresponding control contacts of said units rotor and said tens rotor respectively, means to transfer movement of said units rotor to said tens rotor in order that said tens rotor will rotate between two adjacent control positions when said units rotor makes one complete revolution, means to transfer movement of said motor to said units rotor for movement thereof in accordance with the operation of said motor, relay means controlled by said units rotor and said tens rotor to cause said motor to operate to any control position established by said first and second control switch, said motor being stopped thereby when said units rotor which is driven by said motor rotates said units rotor and said tens rotor to control positions corresponding to the control positions established by said first and second rotary control means.

2. A position selector as in claim 1 wherein said means to transfer movement of said units rotor to said tens rotor includes a first shaft coupled to said units rotor and a second shaft coupled to said tens rotor and a Geneva movement coupling said first shaft to said second shaft to impart intermittent rotational movement to said second shaft.

3. A position selector as in claim 1 wherein said units rotor includes a first disk and a second disk each having a radial slot located on its periphery, said first shaft having said first and second disks located thereon and di-electrically coupled to said first shaft and to each other, and the radial slots of said first and second disks being disposed in aligned relationship with each other.

4. A position selector as in claim 1 wherein said tens rotor includes a first split rotor and a second split rotor, means disposing said first and said second split rotors in dielectrically coupled relation for simultaneous movements, the split sections of said first and second split rotors being disposed in aligned relationship with each other.

5. A position selector for automatically positioning a remote device comprising a first control switch having units terminals with ten control positions and adapted to be rotated about said control positions, a second control switch having tens terminals with thirteen control positions and adapted to be rotated about said control positions, said first control switch having first and second members with a plurality of control contacts, said second control switch having third and fourth members with a plurality of control contacts, means to rotate said first and second control switches to a desired control position, a first relay having relay contacts, means coupling said first member of said first control switch to the energizing coil of said first relay when said first member is moved to alternate control positions, a motor, a units rotor having a number of control contacts corresponding to the control positions of said first control switch, a tens rotor having a number of control contacts corresponding to the control positions of said second control switch, means coupling said second member of said first control switch to the corresponding control contacts of said units rotor when said second member is moved to one or the other of two adjacent control positions, a second relay having relay contacts, means coupling said third member of said second control switch to the energizing coil of said second relay when said third member is moved to alternate control positions, means coupling said fourth member of said second control switch to the corresponding contacts of said tens rotor when said fourth member is moved to one or the other of two adjacent control positions, said units rotor includes a first disk and a second disk each having a radial slot located on its periphery, said tens rotor including a first split rotor and a second split rotor, a first shaft coupled to the output of said units rotor, a second shaft coupled to the input of said tens rotor, a Geneva movement coupling said first shaft to said second shaft to impart intermittent rotational movement to said second shaft so that it will move between two adjacent control positions of said tens rotor when said units rotor makes one complete revolution, conductors connecting alternate control contacts of said second member and said fourth member to corresponding control positions of said first and second disks and said first and second split rotors respectively, a shaft transferring the movement of said motor to said units rotor for movement thereof in accordance with the operation of said motor, means coupling said units rotor and said tens rotor to said relay positions of said first and second relays to cause said motor to operate to any new control position established by said first and second control switches, said motor being stopped thereby when said first shaft which is driven by said motor rotates said first and second disks and said first and second split rotors to control positions corresponding to the control positions established by said first and second control switches.

References Cited in the file of this patent

UNITED STATES PATENTS

| | | |
|---|---|---|
| 2,840,774 | Nordstrom | June 24, 1958 |
| 2,848,677 | Stockwell | Aug. 19, 1958 |

FOREIGN PATENTS

| | | |
|---|---|---|
| 532,340 | Canada | Oct. 30, 1956 |